(12) United States Patent
Strahan et al.

(10) Patent No.: US 7,974,219 B2
(45) Date of Patent: Jul. 5, 2011

(54) NETWORK TROUBLESHOOTING USING PATH TOPOLOGY

(75) Inventors: Robert Strahan, Herndon, VA (US); Michael Cameron, Galston (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 229 days.

(21) Appl. No.: 12/232,966

(22) Filed: Sep. 26, 2008

(65) Prior Publication Data

US 2010/0080129 A1 Apr. 1, 2010

(51) Int. Cl.
*H04L 12/28* (2006.01)

(52) U.S. Cl. ......................... 370/254; 709/224

(58) Field of Classification Search .................. None
See application file for complete search history.

(56) References Cited

U.S. PATENT DOCUMENTS

| | | | |
|---|---|---|---|
| 5,559,955 A * | 9/1996 | Dev et al. | 714/4 |
| 6,950,497 B2 * | 9/2005 | Drury et al. | 379/14.01 |
| 7,616,579 B2 * | 11/2009 | Slattery et al. | 370/241 |
| 2007/0106768 A1 | 5/2007 | Frietsch et al. | |
| 2007/0115967 A1 | 5/2007 | Vandenberghe et al. | |
| 2007/0230367 A1 | 10/2007 | Chitale | |
| 2008/0101419 A1 | 5/2008 | Suriyanarayanan | |

* cited by examiner

*Primary Examiner* — Kwang B Yao
*Assistant Examiner* — Alex Skripnikov

(57) ABSTRACT

A system, and a corresponding method, implemented on a suitable computing device, provides for troubleshooting a network using path topology. The system includes a network node manager that generates and displays a path topology. The path topology a most probable path between two end point elements in the network. The most probable path includes one or more network elements disposed between the two end point elements, and the path topology includes identities of each of the network elements. The system also includes a health report generator, coupled to the network node manager, that receives identities of each of the network elements, determines summary performance information for each of the network elements, and displays the summary performance information.

13 Claims, 5 Drawing Sheets

NETWORK TROUBLESHOOTING USING PATH TOPOLOGY

BACKGROUND

Computer network applications, such as Web browsers, depend on reliable and fast information transfer. When a network fault occurs, such as when a transmission link fails, the network may experience congestion and corresponding performance problems. These performance problems may be noticed by end-users and by automated computer monitoring applications that are installed on the network and that are designed to detect such performance problems. An end-user who notices a performance problem may call an information technology (IT) network technical support line to report the problems, or the end-user may submit a trouble ticket or other type of error report. Upon receiving a call from an end-user, or an error report, a network operator is faced with the often difficult task of pinpointing the actual cause of the performance degradation. The network operator's task is made difficult by the fact that the reported performance problem may actually be caused by errors in the end-user's computer or the on a network server, and by the fact that the reported problem may be transient. Thus, the actual cause of the performance degradation may be very difficult or impossible to determine.

SUMMARY

What is disclosed is a system, and a corresponding method, implemented on a suitable computing device, that provides for troubleshooting a network using path topology. The system includes a network node manager that generates and display a path topology. The path topology includes a most probable path between two end point elements in the network. The most probable path includes one or more network elements disposed between the two network end-point elements, and the path topology includes identities of each of the network elements. The system also includes a health report generator, coupled to the network node manager, that receives identities of each of the network elements, determines summary performance information for each of the network elements, and displays the summary performance information.

DESCRIPTION OF THE DRAWINGS

The detailed description will refer to the following drawings in which like numerals refer to like items, and in which.

DETAILED DESCRIPTION

Figure 1:
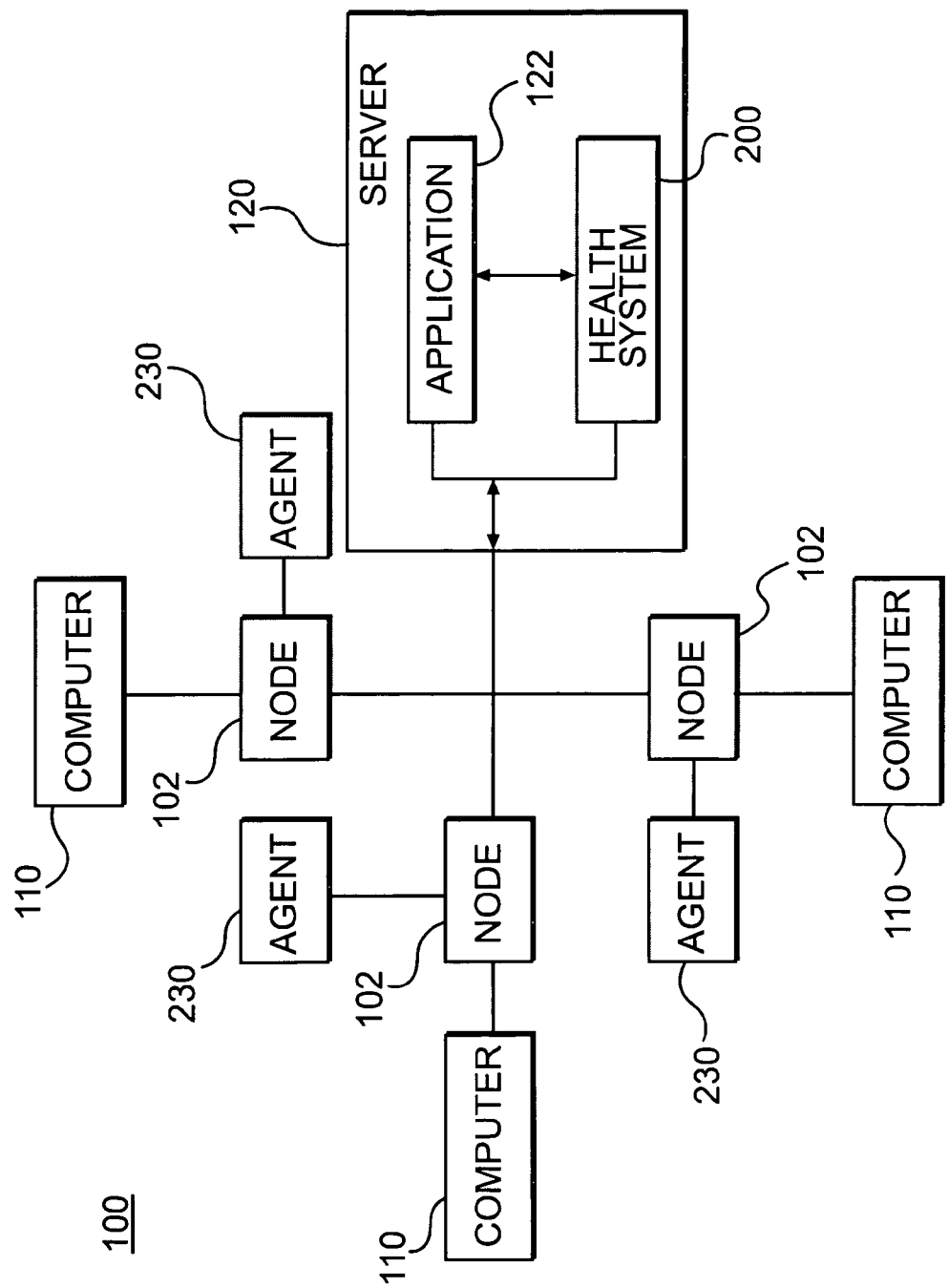
FIG. 1 is a block diagram of a computer network on which is installed an exemplary system for reporting infrastructure health.

Computer network applications, such as Web browsers, depend on reliable and fast information transfer. When a network fault occurs, such as when a transmission link fails, the network may experience congestion and corresponding performance problems. These performance problems may be noticed by end-users as well as by automated computer monitoring applications that are installed on the network and that are designed to detect such performance problems. An end-user who notices a performance problem may call a network help desk to report the problems, or the end-user may submit a trouble ticket or other type of error report. Upon receiving a call from an end-user, or an error report, a network operator is faced with the often difficult task of pinpointing the actual cause of the performance degradation. The network operator's task is made more difficult by the fact that the reported performance problem actually may be caused by errors in the end-user's computer or on a network server, and by the fact that the reported symptoms may be transient. Current network monitoring applications are ill-equipped to deal with these and other difficulties in assessing and correcting network performance problems.

To solve limitations with current network monitoring applications, disclosed herein is a system, and a corresponding method, for computer network troubleshooting using path topology. The path topology serves as the context for locating and reporting network faults. The herein disclosed system can determine the most probable network path being used by the application that is experiencing the network fault, and present this information as a path topology to the network operator. The path topology includes an identified set of network elements (nodes, interfaces, and interconnecting links) that connect two end-point network elements (such as an end-user's computer in communication with a network server (for example, connecting the Web browser of the end-user's computer to a Web server in a data center)).

The system includes a network node manager subsystem and a path health report subsystem. The network node manager subsystem identifies the most probable network path over which two or more network elements, such as computers, are interacting. The most probable network path includes all relevant network elements, specifically all nodes, links, interfaces, and computing systems. The network node manager subsystem also may identify performance characteristics or metrics pertinent to one or more of the nodes, links, interfaces, and computing systems, and may make those performance metrics available for viewing by the network operator. Finally, the network node manager will produce a "path view" of the most probable network path between two network end-point elements.

The path health report subsystem produces relevant health and performance information for each network element in the most probable network path, and generates a visually-displayable performance report for the most probable network path, including any path areas that currently are, or have been, experiencing performance problems. When displayed, the path health report allows the network operator to determine if the network itself is the most probable cause of a reported or detected problem, of if the problem is more likely due to an error in one of the network end-point elements (e.g., the server or the end-user's computer).

In addition to pinpointing the most probable cause and location of the network problem, the path health report subsystem allows the network operator to assess if the problem is a sudden occurrence, perhaps the result of a network failure, or has been gradually building, perhaps due to too many end-users coming on line on the network. This information allows the network operator to effectively engage the appropriate processes and resources to resolve the problem and to restore the computer network to reliable performance.

To produce the path health report, the system (i.e., the network node manager and path health report subsystems) relies on a data collection routine, such as a polling operation, to collect performance metrics from the network elements. However, these network elements first must be identified. Thus, one aspect of the system includes a mechanism to discover the network elements. In another aspect, the network elements may be known in advance and that information may be programmed into the system.

The polling operation may be periodic or episodic. In one aspect, the polling operation uses SNMP polling to periodically collect performance metrics from the key devices and interfaces.

The collected health metrics may be stored in a time series dimensional database, using, for example, OLAP (on line analytical processing) technology, from which the collected performance metrics can be filtered, retrieved, and summarized.

The path health report produced by the system may display information in graphical formats, with color codes as performance indicators. The path health report may include information related to a sequential list of network elements (nodes and interfaces), where the sequential list is determined by a multi-valued runtime parameter (the path elements parameter).

To produce the path health report, a network operator may launch a URL action from a hyperlink embedded in a displayed path view. The multi-valued path elements parameter is sourced from the displayed path view at runtime, so that when the health report URL is launched, the URL passes only the identifiers for the network elements associated with the path currently displayed in the path view (i.e., the most probable path). This filtering mechanism greatly improves the informative value of the path health report, and enhances the network operator's ability to correctly discern the source of the network performance problem, since only network elements in the most probable path have their performance information produced.

Path topology, as used herein, is based on the ISO-OSI layer model. This model, which includes seven layers, is a reference model in which one layer uses functionalities provided by the layer below. The degree of abstraction increases when going up from layer 1, which is the bottom-most layer, to layer 7, the uppermost layer. To properly understand the nature of a network performance problem, the network operator may need path topology information for the bottom three layers (layers 1-3)

A physical layer, also referred to as layer-1, defines all electrical and physical specifications for network elements. This includes the layout of pins, voltages, and cable specifications. Interconnect elements operating on the physical layer include hubs and repeaters. The major functions and services performed by the physical layer are the establishment and termination of a connection to a communications medium, whereby communication resources are effectively shared among multiple users.

A data link layer, also referred to as layer-2, provides the functional and procedural mechanisms to transfer data between network elements and to detect and possibly correct errors that may occur in the physical layer. Layer-2 uses a physical addressing scheme, which means that element addresses are hard-coded into the network elements at the time of their manufacture. The addressing scheme, typically MAC (Medium Access Control) addresses, is flat, and is used in the context of the Ethernet protocol. Other examples of data link protocols are HDLC (High-Level Data Link Control) and ADCCP (Advanced Data Communication Control Procedure) for point-to-point or packet-switched networks and LLC (Logical Link Control) and ALOHA for LANs (local area networks). The data link layer is the layer at which bridges and switches operate by reading the MAC addresses of incoming data frames (the data units on the data link layer) and forwarding the data frames according to "forward tables." A "forward table" is a table that indicates to which port a layer-2 element should forward incoming data frames. Note that a layer-2 interconnect element not only "sees" its direct neighbors via a port but all the network elements that are reachable via this port, whereas physical connectivity is only provided among locally attached network elements.

The layer-2 topology of a network includes all layer-2 addressable end-point elements (usually devices having a MAC address) and all interconnect elements operating at layer-2 (e.g. switches, bridges) and how they are interconnected, i.e., via which ports the layer-2 elements are interconnected. Since routers, which actually operate at layer-3, are layer-2 addressable, routers also are part of a layer-2 topology of a network.

A network layer, also referred to as layer-3, provides the functional and procedural mechanisms for transferring variable length data sequences from a source to a destination via one or more networks while maintaining the quality of service requested by the transport layer, which is the layer above the network layer. The network layer performs network routing, flow control, segmentation/desegmentation, and error control functions. Network elements operating at this level include routers. The network layer sends data throughout the extended network and makes the Internet possible. Layer-3 uses logical addressing (e.g., IP addressing), with the address values are chosen by a network engineer or a DHCP (dynamic host configuration protocol) server, which enables IP addresses to be dynamically assigned to end-point elements. The protocol pertaining to the network layer is the Internet Protocol (IP) and data units of the network layer are referred to as IP packets.

The layer-3 topology of a network includes all layer-3 addressable end-point elements (i.e., elements having an IP address) and interconnect elements that forward information according to IP source and destination addresses of IP packets (i.e., routers). The layer-3 topology further refers to the interconnection between all layer-3 addressable end-point elements and routers.

The network discussed herein may be an IP network running the TCP/IP protocol suite. Every host and router on the Internet has an IP address, which encodes its network number and host number. The combination is unique: in principle, no two elements on the Internet have the same IP address. However, the inventions recited in the attached claims are not limited to network elements that are on the Internet. Other embodiments are directed to any network element and its associated network, including, for example, a LAN.

FIG. 1 is a block diagram of an computer network 100 on which infrastructure health system 200 is installed to monitor and report on performance of the computer network. The computer network 100 includes a server 120, which is operated by, or on behalf of, an enterprise. The computer network 100 also includes several nodes (e.g., computers 110) supporting Web browsers and other applications, and other nodes and interfaces 102 coupling the computers 110 to the server 120. A service provider (e.g., Internet service provider, online service provider) provides the server 120 for use by customers (e.g., the enterprise) of the service provider. The customers may include, for example, a Web site host. The server 120 includes a Web server application 122, which supports a Web site accessed by end-users using Web browsers according to the well-known HTTP (hypertext transfer protocol) protocol. The enterprise referred to above may include all the elements shown in FIG. 1 (i.e., including the computers 110), or a subset of those elements (e.g., the computers 110 are outside the enterprise).

Figure 2:
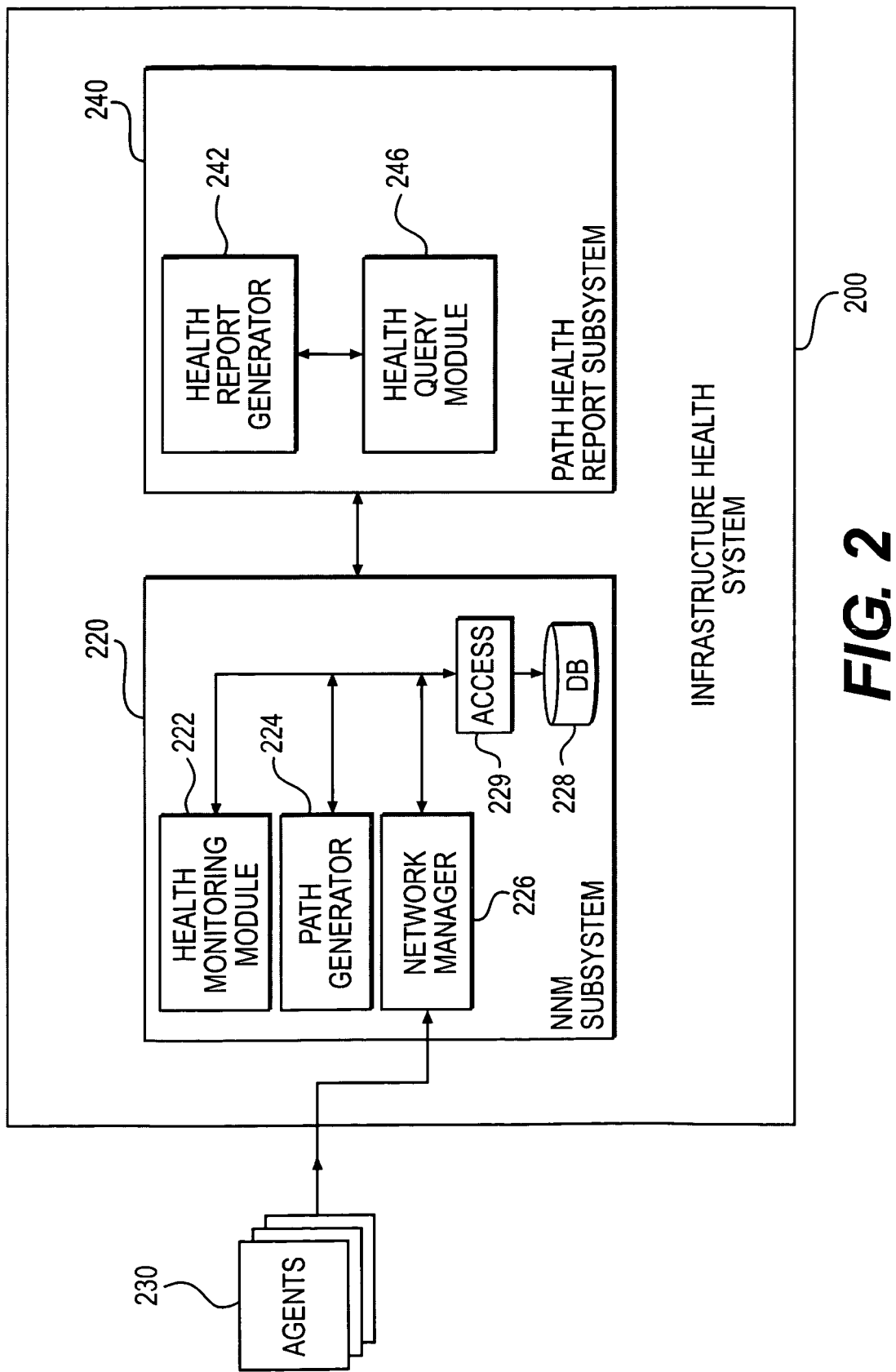
FIG. 2 is a block diagram of an exemplary system for reporting infrastructure health.

The server 120 also includes the infrastructure health system 200, an exemplary version of which is shown in block diagram format in FIG. 2. Alternately, the infrastructure health system 200 may be installed on a separate computer system, and further may be associated with the enterprises' help desk. The infrastructure health system 200 is comprised of network node manager (NNM) subsystem 220 and path health report subsystem 240. The NNM subsystem 220 includes a health monitoring module 222, a network path generator 224, a network manager 226, and a time series database 228 and associated access module 229.

The health monitoring module 222 lets network operators at the enterprise see how well the computer network 100 is performing. More specifically, the health monitoring module 222 enables a network operator to monitor the health of the computer network 100. The health monitoring module 222 accesses performance information obtained by the network manager 226, stores the information in the database 228, and, using this information, constructs indications of network health and performance for display (e.g., in the window 12 of FIG. 3) to the network operator, who then can view the network health and performance indications and perhaps the underlying data on which the indications are based and/or other information.

The network path generator 224 uses sophisticated algorithms to determine one or more possible paths between two network end-point elements in the network 100. These one or more paths may include a most probable path 20 (see FIG. 3), which may be displayed for use by the network operator. That is, the end-points define the loci for execution of the network application, including the most probable path between the two end-points. Other paths that may be possible, but that are less probable, also may be displayed at the discretion of the network operator.

The algorithms used for determining the one or more most probable paths include a nearest neighbor algorithm. This and other path topology algorithms are disclosed in U.S. Patent Publications 2007/010678, Methods for IT Network Representation and Associated Computer Program Products; 2007/0230367, Method and System for Determining the Topology of a Network; 2007/0115967, Dynamic Discovery of ISO Layer-2 Topology; 2008/0101419, Methods and Apparatus for Network Configuration Baselining and Restoration, the disclosures of which hereby are incorporated by reference.

While the most probable path, and other possible paths may be generated in time close to the report of a network problem, the network path generator 224 is not so limited. The network path generator 224, by accessing historical network configuration data stored in the database 228, also can construct a most probable path, or other possible network path, for a prior period. The network operator then can compare an earlier most probable path to a current or more recent most probable path to determine if any path changes have occurred. Such path changes in themselves may indicate the existence, nature, and location of a network performance problem.

The network manager 226 collects data regarding performance of the computer network 100. To acquire this performance information, the network manager 226 communicates with several remote node agents 230. A typical remote node agent 230 is associated with a network node, such as a switch, router, or bridge. As such a node operates, its associated node agent 230 records raw performance statistics, which are reported in some form to the network manager 226.

In collecting health and performance data from the network 100, the network manager 226 and the remote node agents 230 preferably communicate using SNMP (simple network management protocol) and/or ICMP (Internet control message protocol). Under SNMP, the node agents 230 are SNMP agents, receiving and sending monitoring and control data, respectively. A SNMP agent typically returns information in the form of a MIB (management information base), which is a data structure defining an element's observable (e.g., discoverable or collectible) variables and controllable parameters. Many network elements, such as routers, hubs, and gateways, support SNMP. A router MIB, for example, may contain fields for processor utilization, up/down status for each interface, error rates on interfaces, congestion metrics (e.g., buffer levels, latency or packet discard rates) and similar information.

ICMP supports ping or echo messages, which are round-trip messages to a particular addressed network element and then back to the originator. By issuing a ping to a network element, the network manager 226 can determine whether the network element is online or offline (i.e., up or down) on the basis of whether the ping message is returned to the network manager 226. Because ICMP messages or other ping messages are universally supported, the network manager 226 can, in this way, determine at least one piece of health information (i.e., up/down status) for network elements that do not support SNMP.

The health reporting subsystem 240 includes health report generator 242 and a health query module 246. The health report generator 242 receives path information for the most probable path 20 (see FIG. 3), or any other possible network path, as determined by the network path generator 224. This path information may be received in real time or may be retrieved from the time series database 228. The health report generator 242 then retrieves, from the database 228, current and/or historical performance data for each network element in the network path, and generates summary information to present to the network operator by way of a user interface (the health report 30—see FIG. 4).

The health query module 246 allows the network operator to perform additional queries of the network elements identified in the network path. For example, the network operator may use the health query module 246 to retrieve and plot, in a time line, all discard data for the last six months for a specific node in the network 100.

Figure 3:
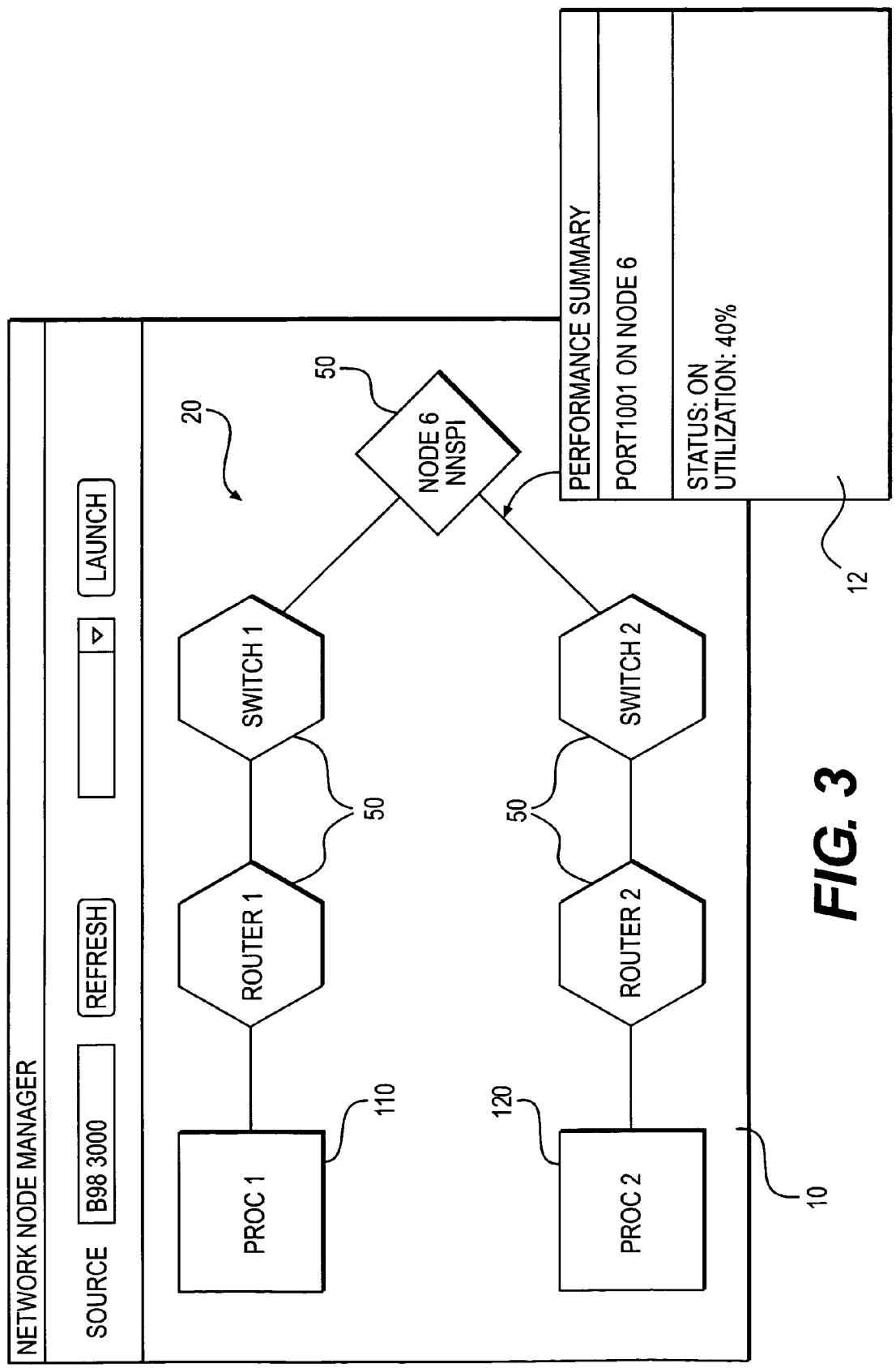
FIG. 3 illustrates an exemplary network node manager report, displayed on a user interface.

FIG. 3 illustrates an exemplary network node manager (NNM) report 10, displayed as a user interface, and viewable by a network operator. The NNM report 10 is generated by the NNM subsystem 220. The NNM report 10 displays as a path view a most probable network path 20 between two network elements, for example, between end-user's computer 110 and the network server 120. The path 20 includes a number of nodes and interfaces 50. The NNM report 10 also can be used to display other possible, but less probable, network paths between the two network end-point elements. Each node and interface 50 may have a history of collected performance metrics stored in the time series dimensional database 228 (see FIG. 2). By moving a mouse, or other pointing or selecting device, over or near one of the nodes and interfaces 50, the network operator may cause the NNM subsystem 220 to produce and display a summary of performance statistics for the selected node or interface 50. An example of such a summary is shown in FIG. 3 as display 12. In addition to the textual information provided in the NNM report 10, other information may be displayed by way of a color coding system. In the example shown in FIG. 3, certain nodes and interfaces 50, for which performance appears to be acceptable, may be displayed in green, while nodes and interfaces for which performance appears to less than adequate may be displayed in another color, such as yellow, for example.

Figure 4:
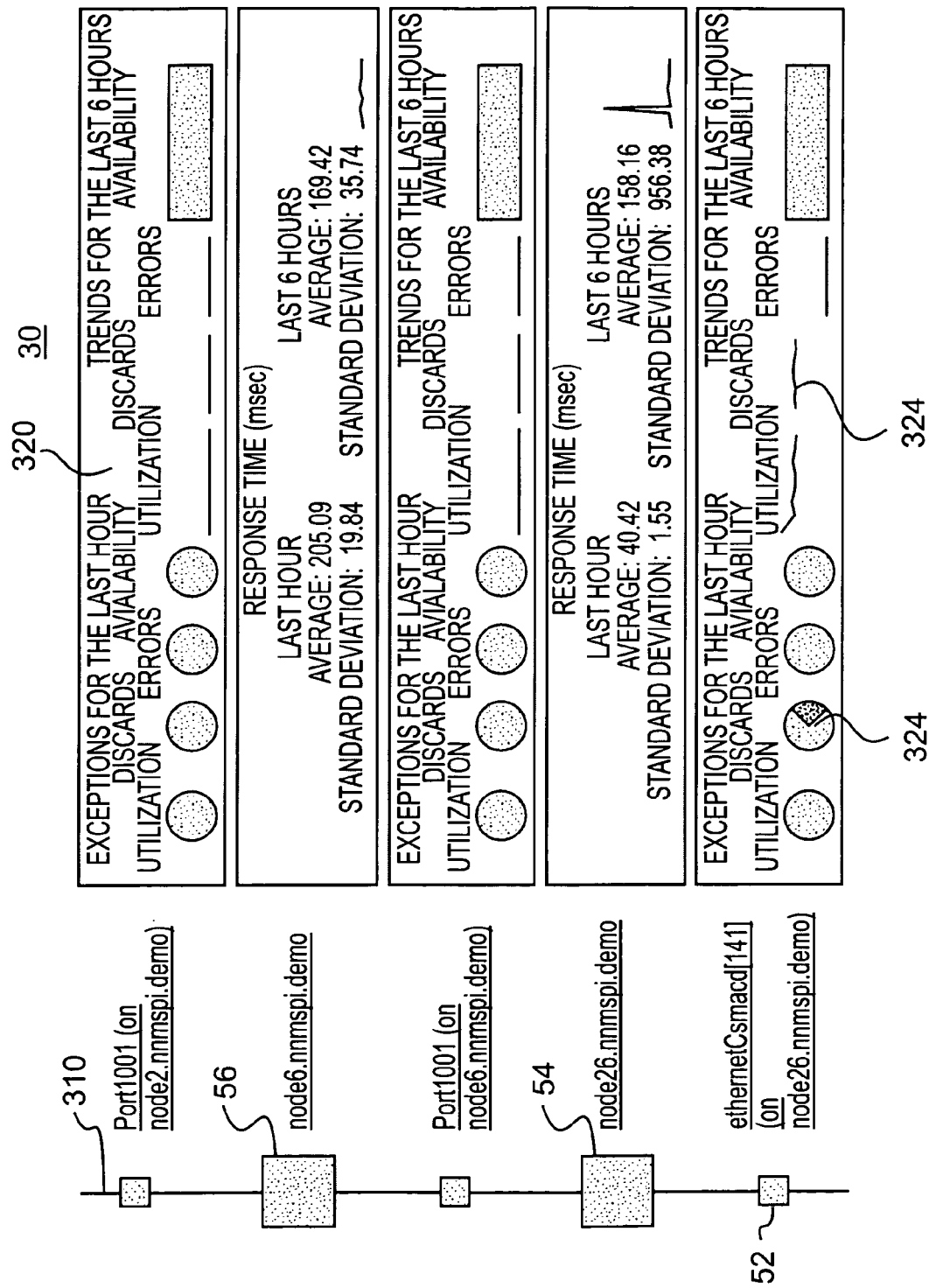
FIG. 4 illustrates an exemplary network path health report, corresponding to the report of FIG. 3, and displayed on a user interface.

In addition to generating the display 12, by selecting a specific node or interface 50 from the displayed network path, the network operator launches a path health report URL. Launching the path health report URL causes the path health report generator 242 to display a path health report, an exemplary version of which is shown in FIG. 4 as path health report 30, and which is available for viewing by the network operator on a user interface, for example. The path health report 30 includes a path view display section 310 showing specific nodes and interfaces 50 from the most probable path 20 (see FIG. 3). The path health report 30 also includes performance display 320, providing specific performance information for each network element (node/interface/link) shown in the path view display section 310. The path view display section 320 includes graphical and textual performance information. In addition, the displayed graphical performance information may incorporate color schemes, or other devices, to enhance problem recognition by the network operator. The displayed performance information includes current and historical performance information. The period for which the historical performance information is displayed may be changed at the direction of the network operator. In the example shown in FIG. 4, the period for display of the historical performance information is the previous six hours.

As can be seen in FIG. 4, the performance display section 320 provides graphical indications (in the example, including pie charts 322) for interface 52 (ehtemetCsmacd) showing a number of packet discards but also showing that the number of discards has not changed noticeably over the past six hours (trend section 324). Other elements of the network 100 shown in path view display section 310 show no errors or trends. The network element 54 (node26) shows an average response time of 158.16 milliseconds while node6 (element 56) shows an average response time of 169.42 milliseconds. Using this displayed graphical and textual performance information, the network operator can determine if a network element is the likely cause of a reported or noted performance problem, of if the cause is more likely with the server 120 or the end-user's computer 110. Furthermore, the network operator can determine if the problem has been growing, perhaps due to an increase in network traffic, or if the problem is the result of the sudden occurrence of a fault. Armed with this intelligence, the network operator can effectively engage the appropriate processes to resolve the performance problem and to restore the desired reliability and performance to the network 100.

In addition to the information displayed in sections 310 and 320, the path health report 30 includes a number of hyperlinks that allow the network operator to perform a more detailed review and analysis of a reported performance problem. For example, each of the node names provided in the path view display section 310 includes a hyperlink to specific data related to that particular network element. By activating the hyperlink associated with network element 52, for example, the network operator can access historical discard data for the past 30 days, the past several months, or some other period specified by the network operator. Another hyperlink allows the network operator to return to the NNM path report 10, which the network operator might choose to do in certain circumstances such as when the path health report 30 shows numerous discards for a particular period. In this example of numerous discards, the culprit might be a failed network element that was bypassed, where the bypass operation eventually caused an overload condition on the network element(s) that is being used to bypass the failed network element. The NNM report 10 will show this rerouting condition, and the corresponding overflow. Armed with this intelligence, the network operator can look for the failed network element, and designate that failed element for repair or replacement.

In addition to providing historical network health information to the network operator, the infrastructure health system 200 (FIG. 2) can produce historical path view information by extracting stored network configuration data from the time series database 228. That is, the system 200, and more specifically the network manager 226 can produce historical "most probable paths" connecting any two end-point elements in the network 100, as long as this configuration data are stored in the database 228. By comparing changes in the "most probable path" between two end-point elements, the network operator can spot potential problem areas, such as network faults.

Figure 5:
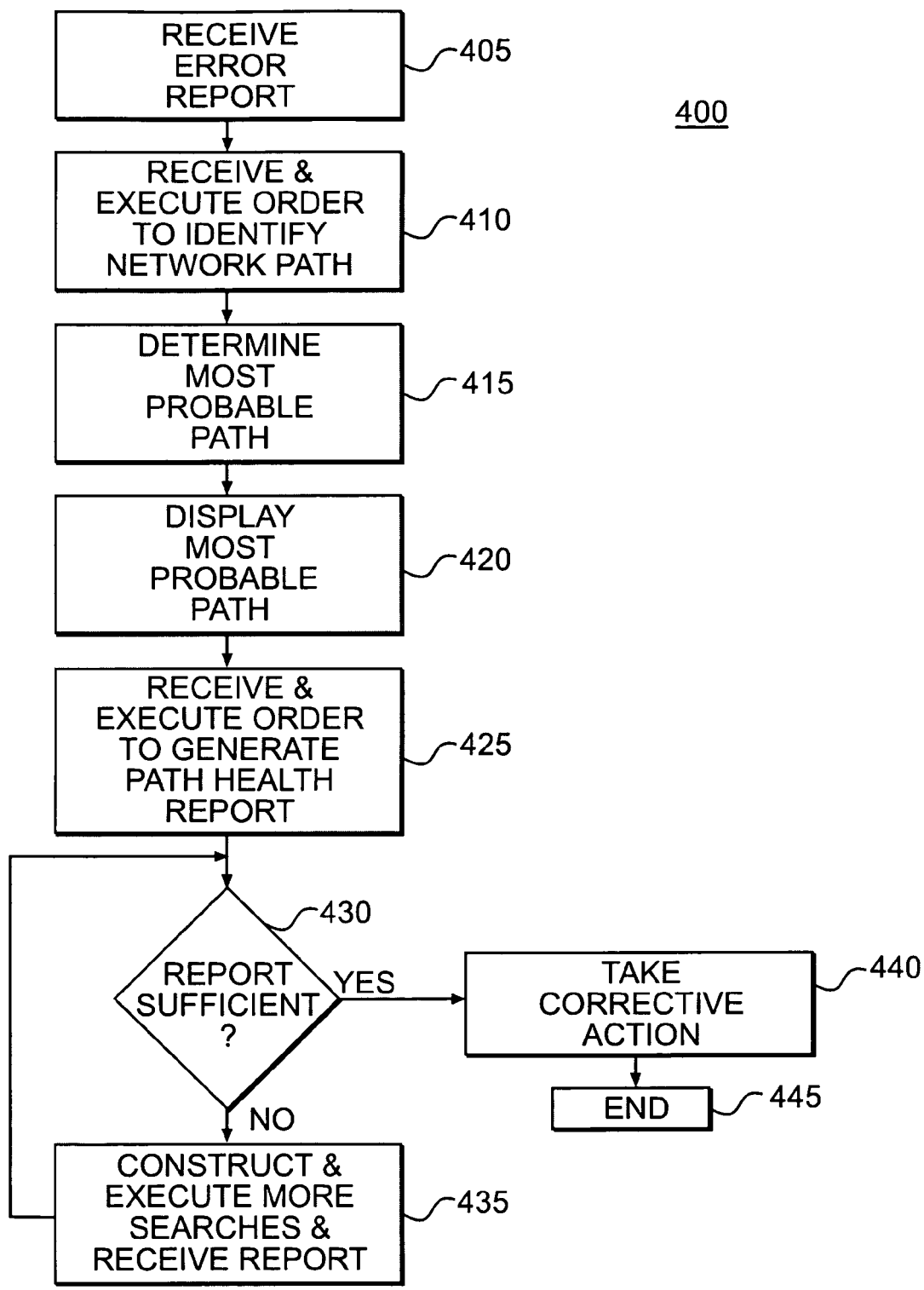
FIG. 5 is a flow chart illustrating an exemplary method for determining the location and nature of a fault in a computer network.

FIG. 5 is a flow chart illustrating an exemplary operation 400 for determining the location and nature of a performance problem in a computer network, such as the network 100 of FIG. 1. The operation 400 begins at block 405 when the NNM subsystem 220 receives an error report from an end-user operating computer 110 on the network 100. In block 410, the network manager 226 determines the identity of the computer 110 and the identity of the network element at the opposite end of the end-user computer connection (in the examples shown, the server 120). Thus, in this example, the identities are the IP addresses of the computer 110 and the server 120. Next, in block 415, the network manger 226 determines the most probable path 20 between the computer 110 and the server 120, including the IP addresses of each network element along the path 20. One method for determining the identities of these network elements is to rely on the ISO-OSI layer model, wherein individual network elements can see their adjacent "neighbors." In block 420, the network manager 226 presents a visual display of the most probable path 20 between the computer 110 and the server 120. Such a display may take the form of the user interface (NNM report 10) shown in FIG. 3. Such display also may include the information display 12, which is shown when the network operator uses a mouse or similar device to select a specific network element from among the elements shown in the NNM report 10.

In block 425, the network manager 226 receives an instruction from the network operator, and in response, generates a path health report 30 (FIG. 4) and provides the report 30 to the network operator by way of a user interface. The path health report 30 includes only those network elements that: (1) are in the most probable path, and (2) are likely to be the cause of the reported problem or error report. The displayed information in the path health report 30 includes current (real time or near real time) information regarding operation of the network elements, and also includes historical information for a selected period. Using the displayed path health report 30, the network operator can elect to pursue additional analysis, including by activating hyperlinks embedded in the path health report 30, or can conclude that the displayed health report 30 provides sufficient information to determine the cause and location of the performance problem (blocks 430-445).

The various disclosed embodiments may be implemented as a method, system, and/or apparatus. As one example, exemplary embodiments are implemented as one or more computer software programs to implement the methods described herein. The software is implemented as one or more modules (also referred to as code subroutines, or "objects" in object-oriented programming). The location of the software will differ for the various alternative embodiments. The software programming code, for example, is accessed by a processor or processors of the computer or server from a long-term storage media of some type, such as semiconductor, magnetic, and optical devices, including a removable disk or a hard drive. The code may be distributed on such media, or may be distributed to network operators from the memory or storage of one computer system over a network of some type to other computer systems for use by operators of such other systems. Alternatively, the programming code is embodied in the memory (such as memory of a handheld portable electronic device) and accessed by a processor using a bus. The techniques and methods for embodying software programming code in memory, on physical media, and/or distributing software code via networks are well known and will not be further discussed herein.

The terms and descriptions used herein are set forth by way of illustration only and are not meant as limitations. Those skilled in the art will recognize that many variations are possible within the spirit and scope of the invention as defined in the following claims, and their equivalents, in which all terms are to be understood in their broadest possible sense unless otherwise indicated.

The invention claimed is:

1. A system, implemented on a suitable computing device, for troubleshooting a network using path topology, comprising:
   a network path generator that generates a path topology and a corresponding visual display, the path topology, comprising:
      a most probable path between two end-point elements in the network, wherein the most probable path comprises one or more network elements disposed between the two end-point elements, the most probable path being a current most probable path between the two end-point elements in the network,
      one or more additional most probable paths between the two end-point elements in the network, wherein each additional most probable path comprises one or more network elements disposed between the two end-point elements, each additional most probable path being a different earlier-in-time most probable path between the two end-point elements in the network, and
      identities of each of the network elements;
   a database access module coupled to a time series database, the time series database storing network configuration data and performance metrics acquired by a network manager; and
   a health report generator, coupled to the network path generator and the database access module, that:
      receives identities of each of the network elements,
      accesses the time series database,
      determines summary performance information for each of the network elements, and
      displays the summary performance information in a path health report,
   wherein the network path generator permits a user to compare the current most probable path to the one or more additional most probable paths, such that a difference between the current most probable path and any of the one or more different earlier-in-time most probable paths is indicative of a network problem between the two end-point elements in the network.

2. The system of claim 1, wherein the path topology further comprises a plurality of layers, wherein the plurality of layers includes a physical layer topology, a layer-2 topology, and a layer-3 topology, and wherein the network elements are disposed among the plurality of layers.

3. The system of claim 1, wherein the displayed summary performance information comprises graphical and textual information related to errors, discards, utilization and availability.

4. The system of claim 1, wherein the path health report comprises links to the path topology.

5. The system of claim 1, wherein a period over which the summary performance information is determined and displayed is variable according to a network operator.

6. The system of claim 1, further comprising local agents that collect network configuration data and performance metrics and transmit the collected data and metrics for storage in the time series database.

7. The system of claim 1, further comprising a health query module for performing additional performance analysis of the network elements.

8. The system of claim 1, wherein the network path generator generates the current most probable path by employing a nearest neighbor methodology.

9. A system, implemented on a suitable computing device, for troubleshooting a network using path topology, comprising:
   a network node manager that generates a path topology based on current and stored network configuration data, the topology comprising a most probable path between two end-point elements in the network, the most probable path being a current most probable path between the two end-point elements in the network, the topology further comprising one or more additional most probable paths between the two end-point elements in the network, wherein each additional most probable path comprises one or more network elements disposed between the two end-point elements, each additional most probable path being a different earlier-in-time most probable path between the two end-point elements in the network, the network node manager also generating a visual display of the path topology; and
   a path health report subsystem, coupled to the network mode manager, that:
      receives identities of each of the network elements,
      determines summary performance information for each of the network elements, and
      displays the summary performance information in a path health report,
   wherein the network node generator permits a user to compare the current most probable path to the one or more additional most probable paths, such that a difference between the current most probable path and any of the one or more different earlier-in-time most probable paths is indicative of a network problem between the two end-point elements in the network.

10. The system of claim 9, wherein the network node manager comprises a database access module coupled to a time series database, the time series database storing network configuration data and performance metrics acquired by the network node manager.

11. The system of claim 10, wherein the path health report subsystem accesses the time series database to retrieve current and historical performance metrics for each of the network elements.

12. The system of claim 9, wherein the network node manager constructs the path topology based on plurality of layers, the plurality of layers comprising a physical layer topology, a layer-2 topology, and a layer-3 topology.

13. The system of claim 9, wherein the network node generator generates the current most probable path by employing a nearest neighbor methodology.

* * * * *

UNITED STATES PATENT AND TRADEMARK OFFICE
CERTIFICATE OF CORRECTION

| | | |
|---|---|---|
| PATENT NO. | : 7,974,219 B2 | Page 1 of 1 |
| APPLICATION NO. | : 12/232966 | |
| DATED | : July 5, 2011 | |
| INVENTOR(S) | : Robert Strahan et al. | |

It is certified that error appears in the above-identified patent and that said Letters Patent is hereby corrected as shown below:

In column 10, line 28, in Claim 9, delete "mode" and insert -- node --, therefor.

Signed and Sealed this
Twenty-seventh Day of December, 2011

David J. Kappos
*Director of the United States Patent and Trademark Office*